(12) United States Patent
Young

(10) Patent No.: US 7,014,413 B2
(45) Date of Patent: Mar. 21, 2006

(54) DOOR ATTACHING APPARATUS

(76) Inventor: Roland O. Young, R.R. 1, Box 138, Grand Forks, ND (US) 58201

(*) Notice: Subject to any disclaimer, the term of this patent is extended or adjusted under 35 U.S.C. 154(b) by 0 days.

(21) Appl. No.: 10/116,470

(22) Filed: Apr. 4, 2002

(65) Prior Publication Data

US 2003/0190219 A1 Oct. 9, 2003

(51) Int. Cl.
*B66F 9/12* (2006.01)
(52) U.S. Cl. .................... 414/743; 414/11; 269/905
(58) Field of Classification Search ............... 269/905; 414/11, 743
See application file for complete search history.

(56) References Cited

U.S. PATENT DOCUMENTS

| | | | | |
|---|---|---|---|---|
| 2,421,123 A | * | 5/1947 | Jensen | 280/47.12 |
| 2,473,873 A | * | 6/1949 | Fosbender | 280/35 |
| 3,138,265 A | * | 6/1964 | Hansen | 414/428 |
| 3,923,167 A | * | 12/1975 | Blankenbeckler | 414/11 |
| 4,810,151 A | * | 3/1989 | Shern | 414/11 |
| 5,464,315 A | * | 11/1995 | Palmer et al. | 414/458 |
| 5,584,635 A | * | 12/1996 | Stapelmann | 414/11 |
| 5,762,348 A | | 6/1998 | EchTernacht | |
| 6,241,447 B1 | * | 6/2001 | Echternacht | 414/11 |
| 6,579,051 B1 | * | 6/2003 | Echternacht | 414/11 |
| 6,857,836 B1 | * | 2/2005 | Keller | 414/11 |

* cited by examiner

Primary Examiner—Khoi H. Tran
(74) Attorney, Agent, or Firm—Robert E. Kleve

(57) ABSTRACT

The invention comprises a door attaching apparatus for positioning and aligning a door for attachment to a doorway. The apparatus has a mobile frame adapted to be moved upon a surface. The mobile frame has a first frame. The first frame is movably mounted to the mobile frame to move upward and downward and forward and rearward relative to the mobile frame with a door mounted thereon. A second frame is pivotably mounted to the mobile frame behind the first frame and is handle operated to move forward and rearward on the mobile frame and to engage the first frame to cause the first frame and door thereon to move forward and rearward with the second frame to align the door in a doorway in one direction for attachment of the door to the doorways. A handle operated cam mechanism is mounted between the first and second frames to cam the first frame and thereby the door upward and downward on the mobile frame align the door in another direction for its attachment to the doorway. A ground engaging mechanism is mounted to the mobile frame to engage the ground to provide additional support for the apparatus.

6 Claims, 8 Drawing Sheets

DOOR ATTACHING APPARATUS

BACKGROUND OF THE INVENTION

This invention relates to door attaching apparatus, more particularly, the invention relates to an apparatus for supporting and aligning a door in a doorway for attachment of the door to the doorway.

It is an object of the invention to provide a novel door supporting and aligning apparatus for supporting and aligning a door in a doorway for attachment of the door to the doorway. It is a further object of the invention to provide a novel door attaching apparatus for moving a door to a doorway and aligning the door in the door angularly in several directions and adjusting the door to an appropriate height for attachment of the door to the doorway.

It is another object of the invention to provide a novel door attaching apparatus for supporting a door in a doorway vertically and angularly while supporting the door in the doorway for attachment of the door to the doorway.

Further objects and advantages of the invention will become apparent as the description proceeds and when taken in conjunction with the accompanying drawings wherein:

BRIEF DESCRIPTION OF THE PREFERRED EMBODIMENT

Figure 1:
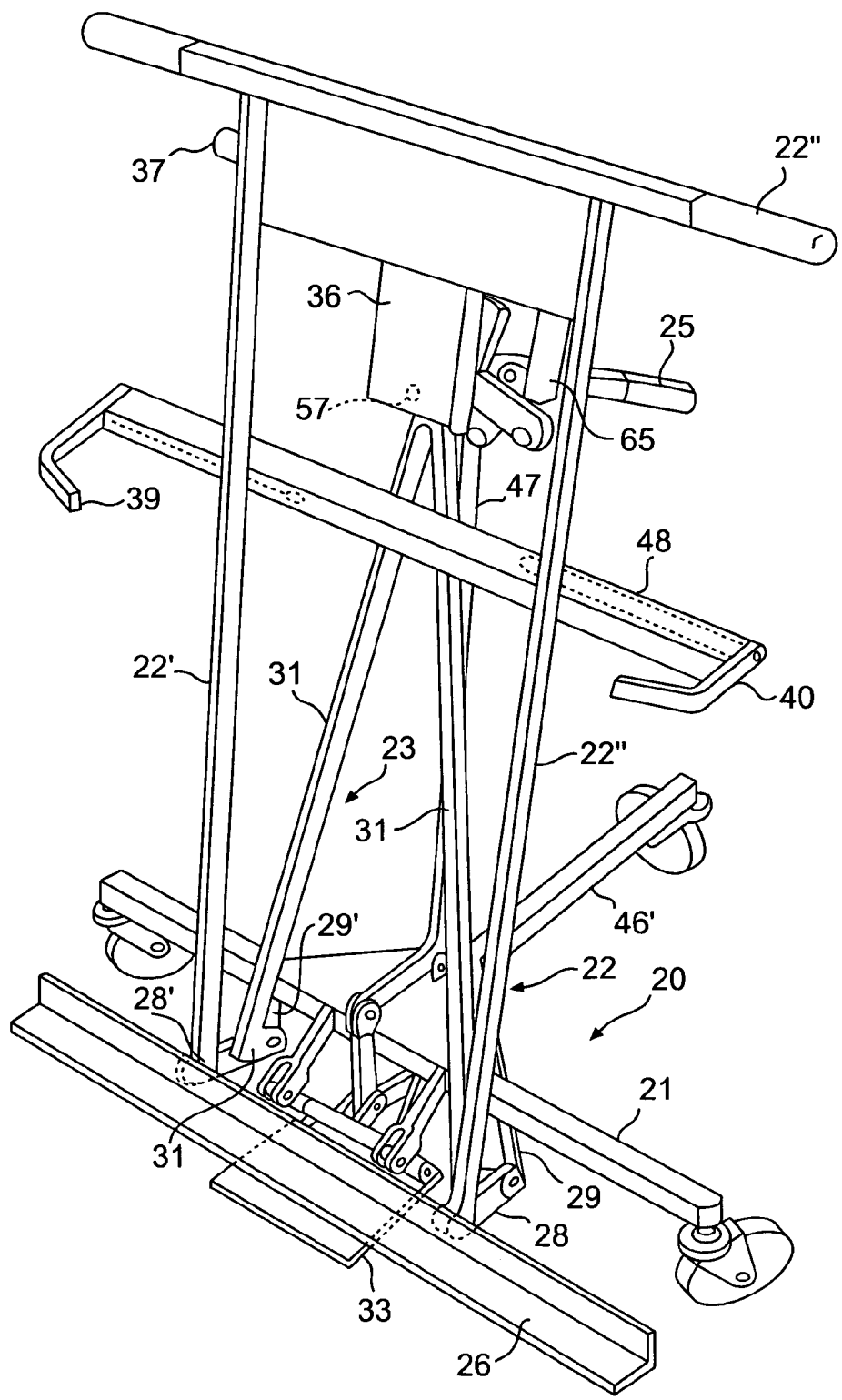
FIG. 1 is a perspective view of the door attaching apparatus.

Briefly stated, the invention comprises a apparatus for positioning and aligning a door in a doorways its attachment to the doorway. The apparatus comprises a mobile frame with a first frame movably mounted on the mobile frame to move forward and rearward and upward and downward relative to the mobile frame with a door mounted thereon. A second frame is mounted on the mobile frame behind the first frame and is handle operated to move forward and rearward and cause the first frame to move forward and rearward with the door thereon to align the door in one direction in doorway for its attachment to the doorway. A handle operated cam mechanism is mounted between the first and second frames to cam the first frame upward and downward relative to the second frame and mobile frame to align the door in another direction for its attachment to the doorway. A ground engaging mechanism is mounted to the mobile frame and operated by the handle of the second frame to engage the surface beneath the apparatus to further stabilize the apparatus.

Referring more particularly to the drawings, in FIGS. 1–4, inclusive, the door attaching device 20 is illustrated having a mobile frame 21, with a door supporting first frame 22 movably mounted thereon for carrying a door 24 thereon. A second frame 23 is mounted behind the first frame 22, on the main frame.

The first frame 22 is generally rectangular with a pair of parallel upward extending rods 22' and 22" and are fixed together at their upper ends by a handle 51 extending horizontally across the rods. A ledge 26 is fixed across the bottom of the rods for receiving the bottom edge 24' of the door 24. The second frame 23 is formed of a pair of rods 31 and 31' converging toward one another at their upper ends to form an inverted V shape. Its lower ends are pivotally mounted to the main frame.

The first frame 22 is movably mounted at the lower ends of its rods to the main mobile frame 21, through a pair of parallel linkage plates 28 and 28'. A pair of vertical posts 29 and 29' fixed to the bottom of the main frame 21, and the plates 28 and 28' at their one ends are pivotally mounted at axis 30 at their one ends to the bottom of the parallel rods of the first frame, and are pivotally mounted at their other ends about a horizontal axis 30' to the bottom ends of the rods 29 and 29' of the main frame 21. Consequently, the frame 22 can move to different positions, forward or rearward, upward or downward and angularly relative to the main frame 21, about the axes 30 and 30' at the ends of link plates 28 and 28' at the bottom of the vertical posts of the main frame to align the door thereon in a doorway for attachment of the door to the doorway.

The second frame 23 is formed of the pair of upward extending diagonal converging rods 31 and 31', which rods have elbows 32 fixed at their lower ends. The ends of the elbows of frame 23 are pivotally mounted to the main frame 21 about the same horizontal axis 30, as axis of the pivotal mounting of the one end of the link plates 28 and 28' of frame 23, to the main frame 21.

A floor supporting plate 33 is movably mounted to the front of the main mobile frame 21 by a pair of parallel linkages 34 and 34' and is movably forward and downward from below the main frame to a position flush on the ground 35 to provide a forward supporting member to support the device 20 firmly on the ground.

The first and second frames 22 and 22' have a guideway 36, mounted centrally of the frames, formed of one channel guideway 36' mounted to frame 22 and a cooperating guideway channel 36" mounted to frame 23 which cooperate together to serve to guide the additional upward and downward movement of the frame 22 relative to the frame 23. The upward and downward movement of the frame 22 is operated by the handle 37, which acts to rotate a cam 38 mounted to the frame 22 to engage a portion of frame 23 and cam the frame 22 upward relative to frame 23 in the guideway. The forward and rearward movement of the frames 22 and 23 is operated by the handle 25.

A pair of elongated side gripping rod members 39 and 40 are slidably mounted horizontally across the frame 22 to grip the lateral outer sides of the door when the door is mounted on the first frame 22. The gripping members have elongated rod portions 39' and 40' each with hooked ends 41 and the rod portions are telescopingly mounted in elongated sleeves 42. The sleeves 42 are fixed horizontally to vertical rods 22' and 22" of the first frame 22. The rod portions are slidably mounted in the sleeves 42 to slide horizontally across the frame, near the upper portion of the first frame 22 and spring urged inwardly toward one another by springs 43 and 43' inside the sleeves.

Each rod is tubular and the springs 43 and 43' each have their one ends mounted inside the tubular rods 39' and 40; with their one end secured to the tubular rods 39' and 40 at locations 45, while inside the rods. The other ends of each spring are mounted to each sleeve 42 at locations 45' to draw the rods toward one another. The elongated rods can be manually telescoped outward to hook the hooked ends of the rods about the door, while the bottom edge 24' of the door rests upon a ledge 26 fixed to the bottom of the frame 22. The rods, being spring urged together, hold the door in place on the ledge of the first frame 22, while it is moved to its various selected positions.

The main frame 21 has two wheels 46 rotatably mounted to the main frame, and a third wheel 46' rotatably, mounted to a swinging support 46" pivotally mounted to the rear of the main frame at pivot 46'" to provide a three wheeled rolling support for the device.

Operation of Forward and Rearward Movement of Door Support Frame:

The forward and rearward movement of the front frame 22 and second frame 23 and the downward and upward parallel movement of the supporting plate 33 is operated by the handle 25 on a rear linkage mechanism 47' pivotally mounted on mobile frame 21. The linkage or lever mechanism 47' has a lever rod 47 operated by the handle 25, and the handle 25 is fixed to one edge of the rotatably disc 49 of the second frame 23.

The lever rod 47, for moving the fist and second frames 22 and 23 forward and rearward on the main frame and for moving the ground supporting plate 33 on the main frame, is pivotally mounted at its lower end to the main frame at axis 47". The lever rod 47 extends upward from the main frame with its upper end pivotally mounted to the rotating disc 49 on the ledge of frame 23 at a offset location 48' on disc 49. The disc 49 is pivotally mounted at axis 49' to a ledge 50. The ledge 50 is fixed to the upper end of frame 23. The handle 25 being fixed to the disc 49, when rotated, will rotate the disc 49 about axis 49' of the ledge and pivot the rod 47 forward or rearward. This connection of the lever rod to the disc provides a leverage connection between the lever rod and frame 23.

The offset circumferential location of the upper end of the rod 47 on the disc 49 to the center axis of rotation of disc 49 to provides a leverage connection between the lever rod 47 and the frame 23, so that counter clockwise rotation of the handle 25 moves the lever rod 47, discs, ledge and handle and frame 23 forward on the main frame.

The frame 23 is connected to frame 22 through the sliding guideway mechanism 36; consequently, the forward or rearward movement of the lever rod 47 by the handle 25 moves the frame 23; forward or rearward, which in turn also moves the frame 22 forward or rearward.

Figure 2:
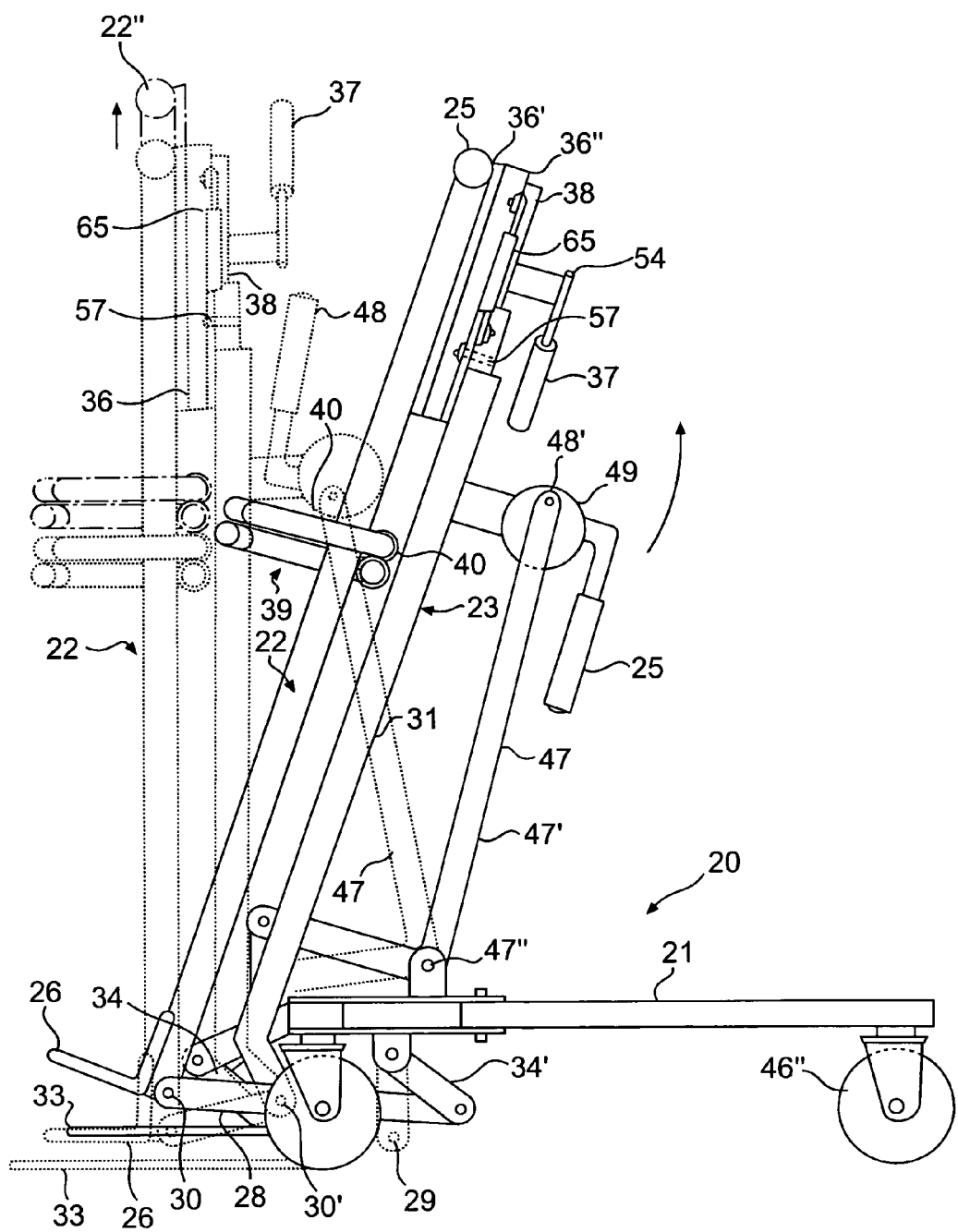
FIG. 2 is s side elevational view of the door attaching apparatus with door attaching frame pivoted rearward in solid lines to illustrate its position, prior to the loading of a door onto the frame. The door frame is pivoted forward and the floor supporting frame moved forward and downward by the forward lever as shown in phantom lines in the first forward position. The door frame is shown slid upward in phantom lines in the second forward position by the raising lever.

The forward or counterclockwise rotation of handle 25 causes the lever rod connection by lever rod 47 to be lengthened by rotating the pivoting upper end of rod 47 counterclockwise from its upper position shown in solid lines in FIGS. 1 and 2 to its lower position shown in phantom lines in FIG. 2 which acts to move the lever rod 47 right to left from its position in solid lines to its position shown in phantom lines in FIG. 2.

The ledge 50 has a disc portion 50' and is fixed to the rear of frame 23. The disc 49 is pivotally mounted to the disc portion 50' of ledge 50 by a pin fixed centrally to disc 49 at axis 49' and extending through and rotatably mounted to disc portion 50' of ledge 50.

Figure 3:
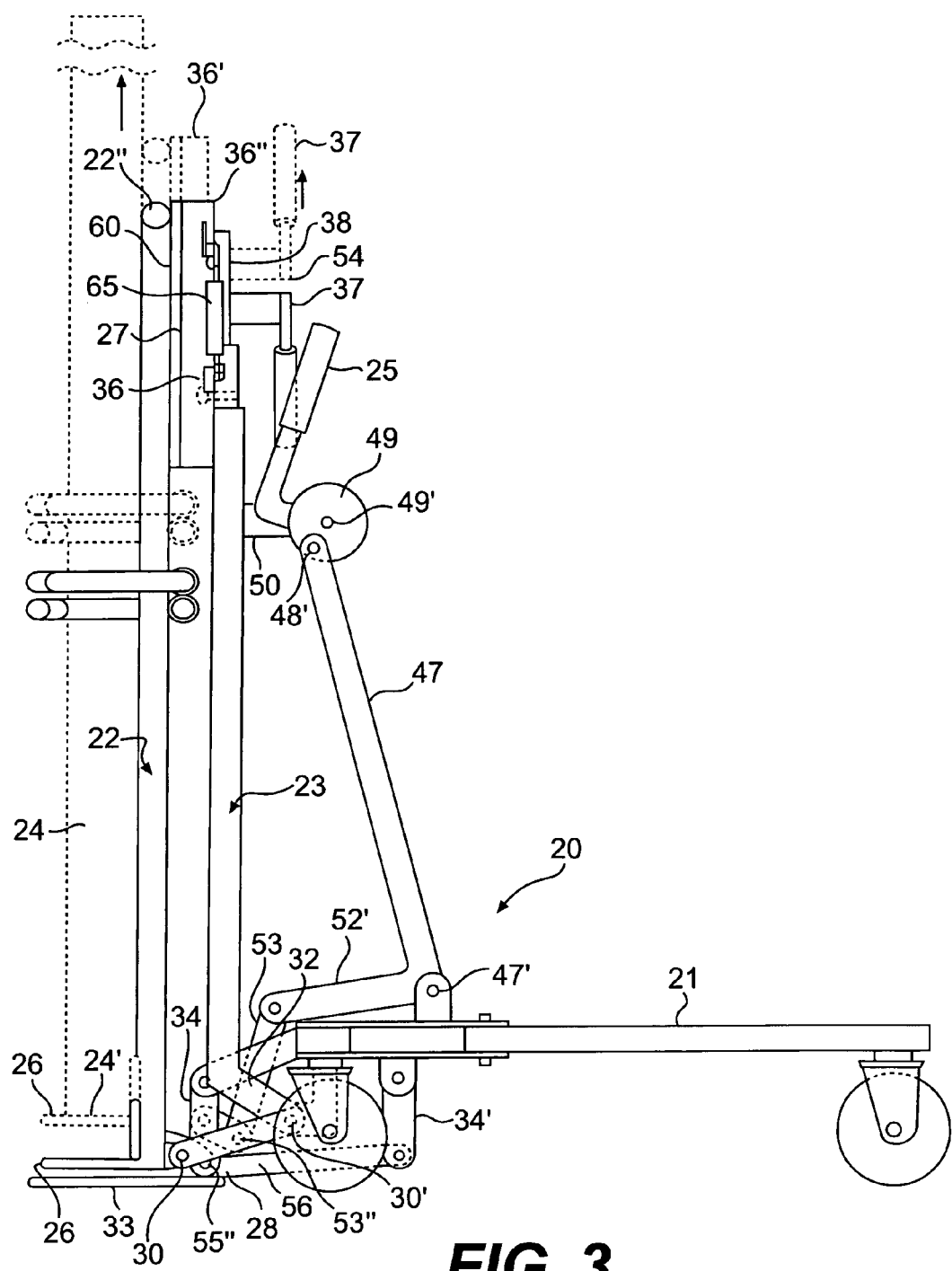
FIG. 3 is a side elevational view of the door attaching apparatus with the door frame pivoted forward and the floor support plate shown moved forward and downward by the forward lever as shown in solid lines. The door frame is shown further slid upward with a door attached to the door frame by the raising lever in phantom lines.
Figure 4:
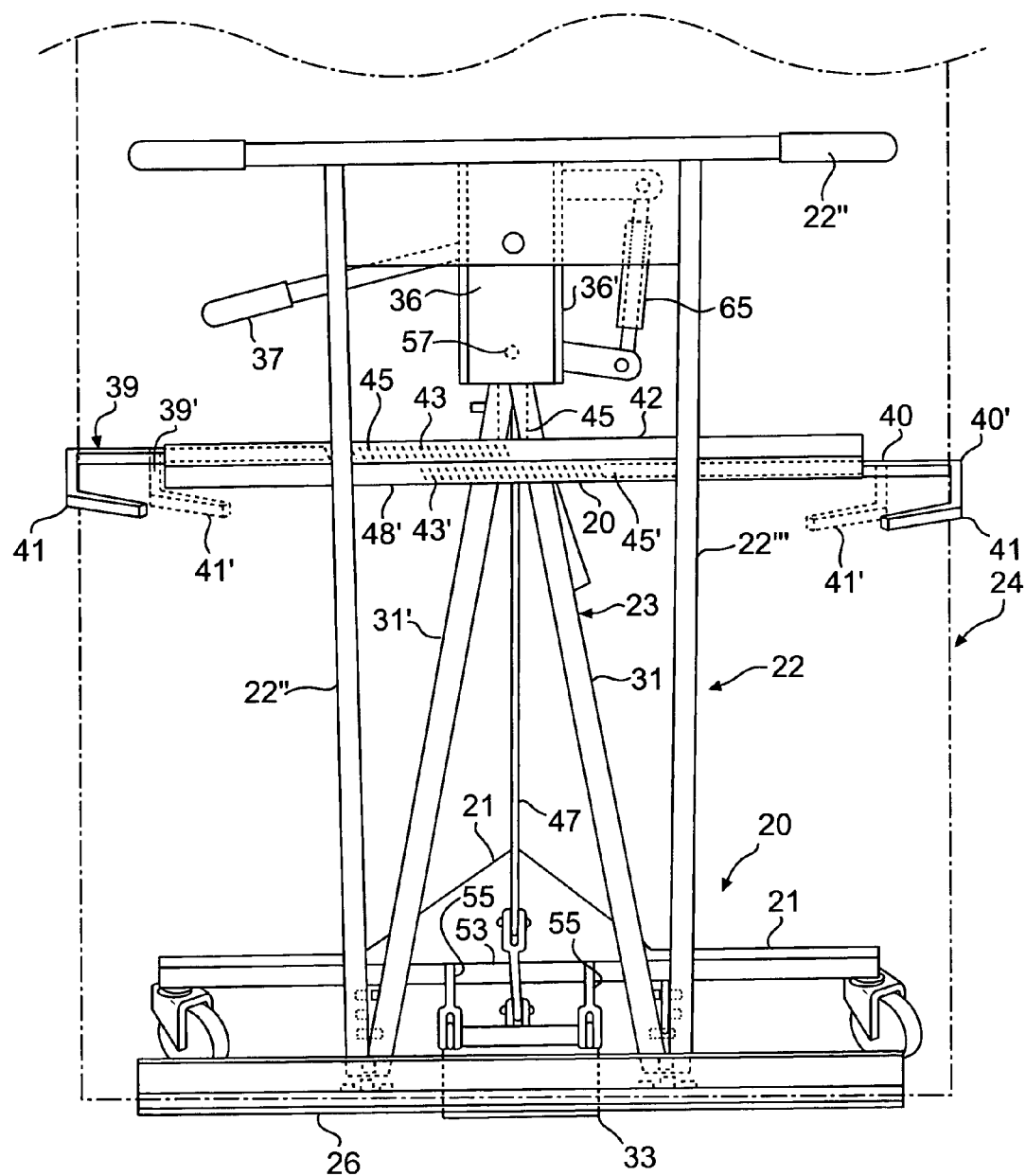
FIG. 4 is a front view of the door attaching apparatus.
Figure 5:
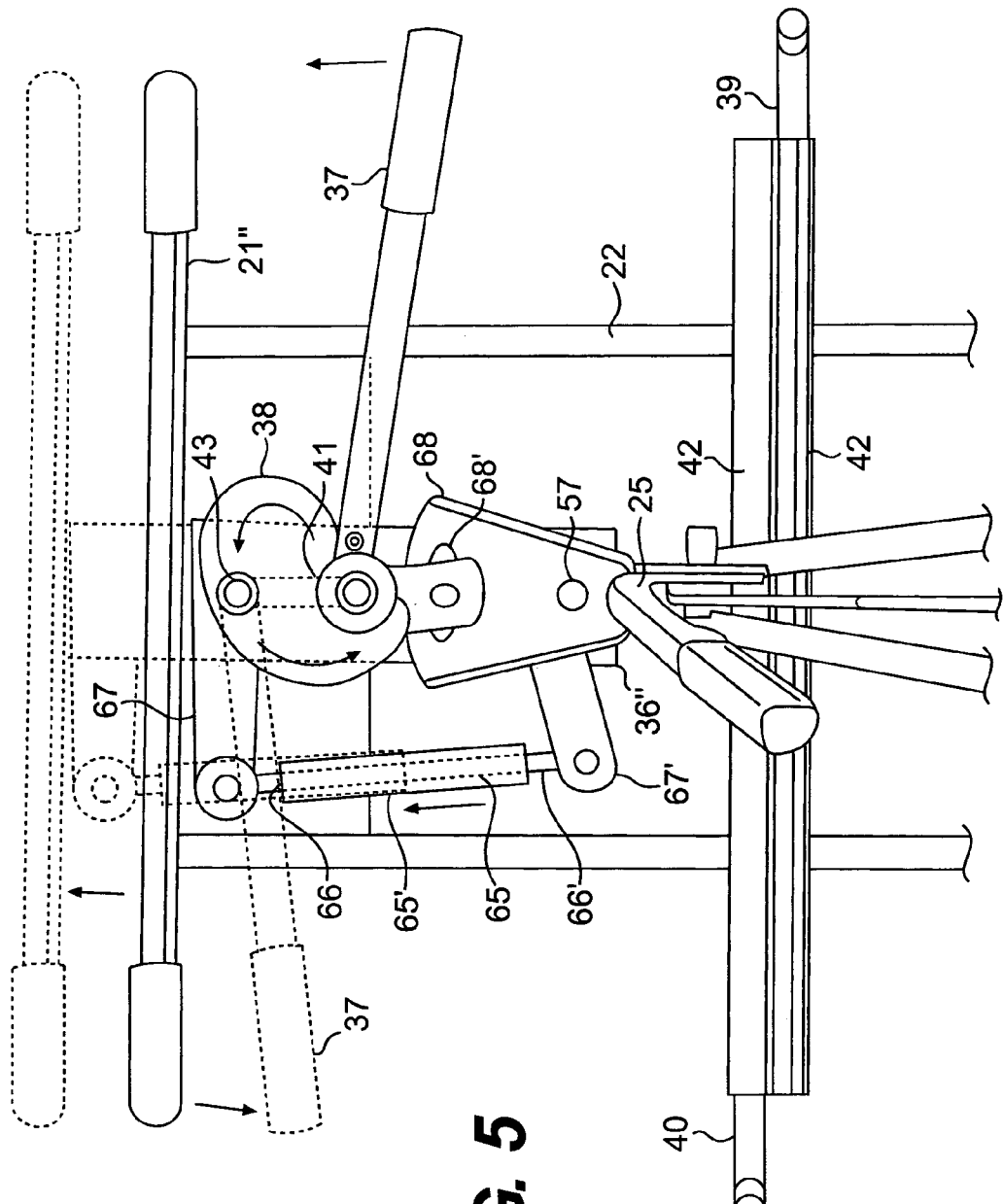
FIG. 5 is an enlarged rear view of the upper portion of the device disclosing the mechanism for raising and lowering the door supporting frame on the device and the mechanism for angular adjustment of the front frame.
Figure 6:
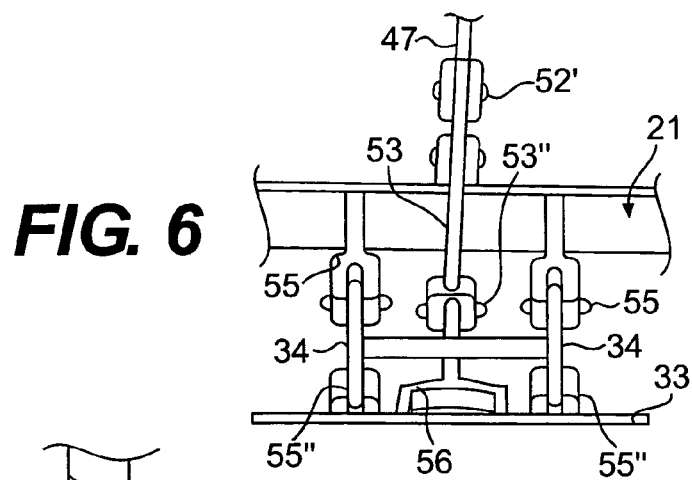
FIG. 6 is an enlarged front view of the ground supporting plate and mechanism.

Counterclockwise rotation of the handle 25 rotates the disc 49 counterclockwise which, when viewed from FIGS. 2 and 3, acts to lever the handle 25, discs, and lever rod 47 forward right to left about its lower pivot 47', and pivots frames 22 and 23 forward right to left about their respective pivotal mountings at their lower ends to the main frame from their positions shown in solid lines in FIG. 2 to their positions shown in phantom lines in FIG. 2 and solid lines in FIG. 3. FIG. 3 shows the components, just mentioned, in solid lines pivoted forward right to left to their forward position.

To operate the ground support plate 33, the lever rod 47 has a forward rod portion 52 fixed thereto and a lever 53 has its one end pivotally mounted to the forward rod portion 52 at axis 52' and its other end pivotally mounted to the link plate 34 at axis 53", which pivot at this axis is intermediate the length of link plate 34. The support plate 33 is mounted to the main frame through parallel linkage plates 34 and 34'. One end of one parallel link plate 34 at axis 55' is pivotally mounted to an arm 55 which arm is fixed to the main frame. The other end of link plate 34 is pivotally mounted to support plate 33 at axis 55". A connecting arm 56 is fixed at one end to the support plate 33 and is pivotally mounted to parallel link plate 34' at its other end 56'. Plate 34' is pivotally mounted at its other end to the main frame at pivot 34".

Figure 8:
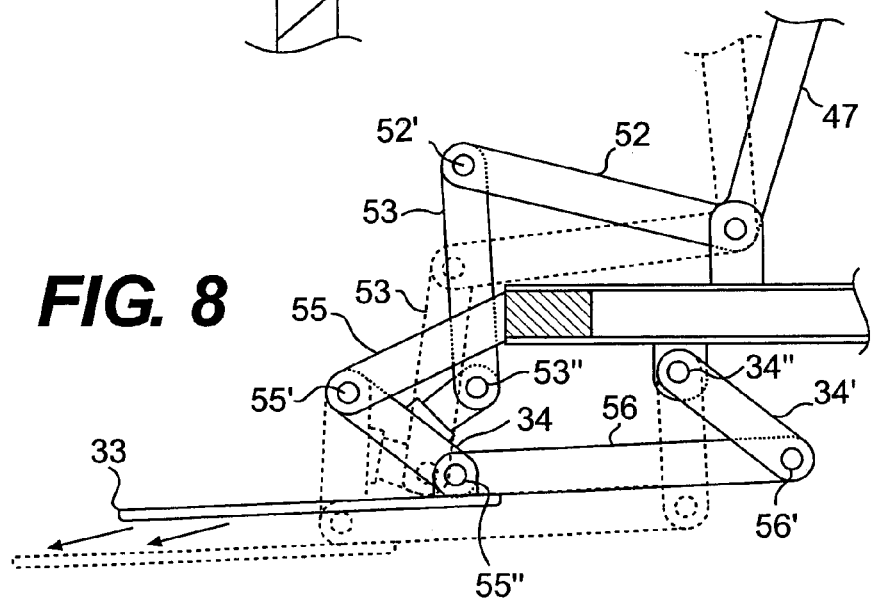
FIG. 8 is an enlarged side view of the ground supporting plate and mechanism.
Figure 9:
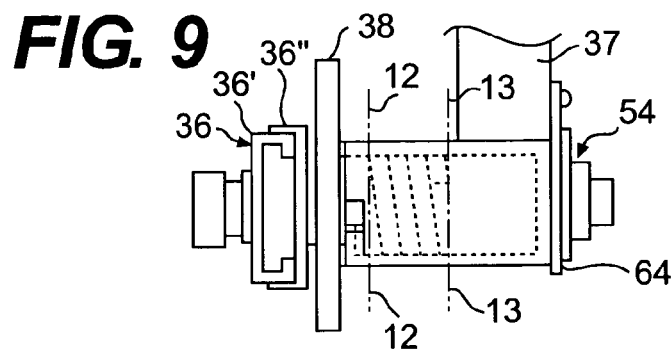
FIG. 9 is an enlarged top view of the spring locking mechanism for the cam and its operation
Figure 10:
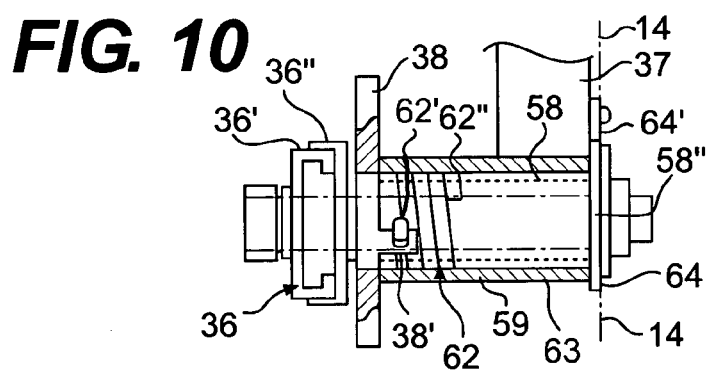
FIG. 10 is a similar view to FIG. 9 with portions cut away.
Figure 12:
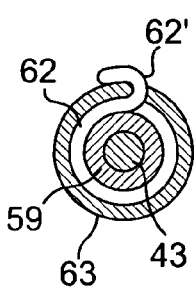
FIG. 12 is a cross sectional view taken along line 12—12 of FIG. 9.
Figure 13:
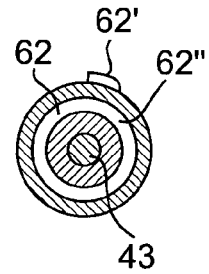
FIG. 13 is a cross sectional view taken along line 13—13 of FIG. 9.
Figure 14:
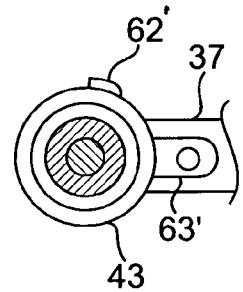
FIG. 14 is a cross sectional view taken along line 14—14 of FIG. 10.
Figure 11:
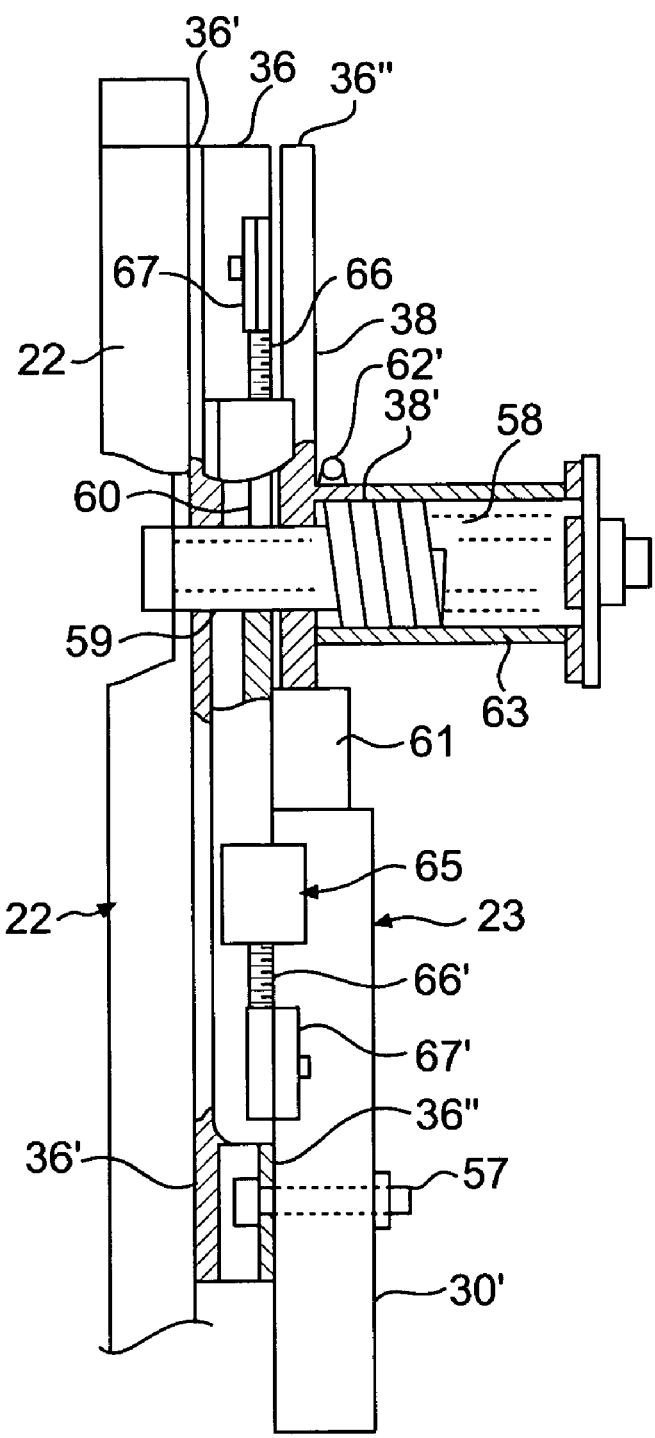
FIG. 11 is an enlarged side of the upper portion of the device and illustrating the angular adjustment mechanism.

The parallel link plates 34 and 34' being pivotally mounted in parallel to the main frame form a parallel linkage. Consequently, pivoting the handle 25 counterclockwise, pivots the lever rod 47 forward, which moves the lever arm 53 downward which pivots the link plate 34 clockwise from its position shown in solid lines in FIG. 8 to its position shown in dashed lines. The downward movement of link plate 34 through the arm 56 pivots the link plate 34' downward in parallel to its position shown in phantom lines, which in turn moves the support plate 23 downward in a parallel path from their position shown in solid lines in FIG. 3, to their position shown in phantom lines in FIG. 3.

Consequently, the counterclockwise rotation of handle 25 also lowers the support plate 33 in parallel relation to the ground to cause the support plate to engage the ground to provide additional stability to the apparatus, and clockwise rotation of handle 25 acts to raise the support plate 23 off the ground.

Sliding Upward and Downward Movement of Door Supporting Frame:

The frame 22 is the door supporting frame and is slidably upward and downward, relative to frame 23 and relative to the main mobile frame 21, through its cooperating C shaped channels 36 and 36' which are mounted in sliding relation to one another. The cooperating channels 36' and 36" are mounted centrally of the width of the frames 22 and 23. The C shaped channel 36' is fixed to the frame 22 and the channel 36" is pivotally mounted to the frame 23 by a bolt 57, so the both channels 36' and 36" and frame 22 may pivot together at an angle relative to frame 23 about the axis of bolt 57, and frame 22 may slide upward on its channel 36' relative to channel 36" and frame 23, and relative to the main mobile frame 21.

The lower end of first frame 22 being pivotally mounted to the main mobile frames 21, through a pair of link plates 28 and 28' each of which are pivotally mounted at their one ends to the lower end of the frame 22 and pivotally mounted at their other ends to the main frame 21; the action of the link plates enable and facilitate the upward and downward sliding of the first frame 22, relative to the second frame 23 and the main mobile frame by the cam action.

The cam 38 is operated by a cam mechanism 54 is mounted on the frame 22, centrally of the width of the frame 22 and just above the cooperating channels 36' and 36". The mechanism 54 acts to turn the cam 38, in response to the turning of the handle 37 by the operator.

The cam mechanism 54 is operated by the handle 37. The handle 37 has an outer housing 63 fixed to the handle. The handle rotates cam 38 about the narrow tubular inner sleeve 59 within the housing. The sleeve 59 is fixed at one end to the C shaped channel 36' of frame 22 and extends out through the C shaped channel 36". The C shaped channel 36", pivotally mounted to frame 23, has a vertical slot 60 for the sleeve to pass therethrough to allow the sleeve on frame 22 to slide upward and downward in the slot 60 of the channel 36' of frame 23 when the frame 22 is cammed upward and downward relative to frame 23 by the cam 38.

Figure 7:
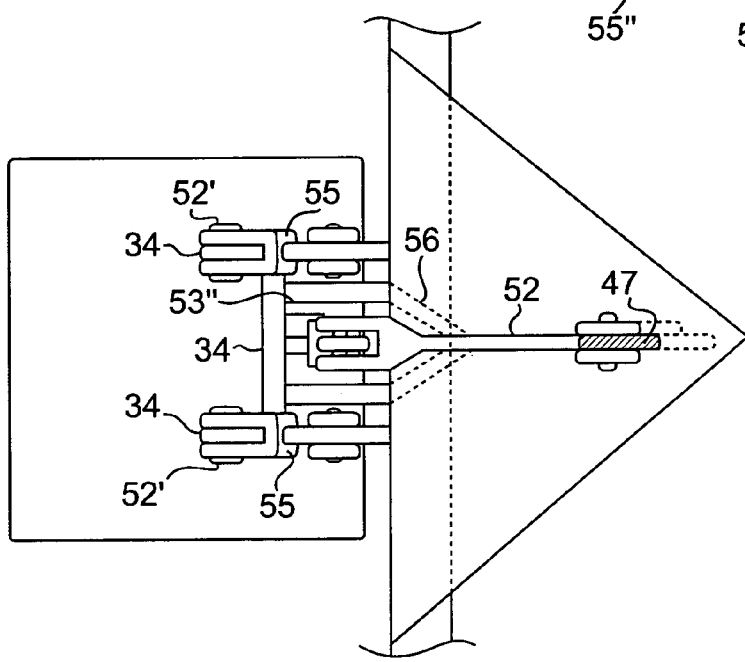
FIG. 7 is an enlarged top view of the ground supporting plate and mechanism

The rotation of the handle 37 counterclockwise, when viewed from FIG. 7, rotates the handle and through the cam mechanism rotates the cam 38 counterclockwise to raise the frame 22 from its position shown in solid lines in FIG. 2, to its position shown in phantom lines in FIG. 2. The raising of the frame 22, relative to frame 23 and the mobile frame 21, is caused by the cam 38 engaging a plate 61, bolted or mounted to channel 36" with the increasing outer dimension of the outer surfaces of the cam, with respect its rotational center axis, causing the frame 22 to rise upward relative to frame 22, and relative to the main mobile frame 21 to its position shown in phantom lines 68 in FIG. 7. Conversely, rotating the handle 37 clockwise, when viewed from FIG. 7, causes the frame 23 to be lowered relative to frame 22.

The cam mechanism provides a spring locking action by spring 62 which prevents the handle and cam from rotating when manual power is not being provides on the handle 37 to prevent overtravel of the cam.

The handle 37 does not directly engage the cam 38. The handle, through its cam mechanism, drives the cam 38. The handle 37 has a outer sleeve 63 fixed to the inner end. The handle sleeve 63 surrounds the mechanism including the spring 62, the end sleeve 58, and the inner sleeve 59, and bolt. The inner sleeve 59, which extends freely through the cam so that the cam can rotate independently of the inner sleeve. However, it is fixed to the channel 36' so that it cannot rotate when the handle is rotated relative to the device 20.

The coil spring 62 surrounds the inner sleeve 59. It is preformed to have a shape with an inner diameter slightly smaller than the outside diameter of the sleeve 59, so that fits tightly about the sleeve and will not move relative to the sleeve 59, unless its hooked end 62' or its other end 62" is circumferentially engaged to cause the coils of the spring to expand radially sufficiently to free the spring from the sleeve to allow the spring to rotate relative to the sleeve 59. The end sleeve 58, adjacent one end of the spring 62, is also freely mounted to the inner sleeve 59.

When rotating the handle 37 counter clockwise to raise the frame 22, the notched edge 63' of the outer sleeve 63 to the handle engages the hooked end 62' of the spring 62 counter clockwise, when viewed from FIG. 7, which causes the spring to expand radially sufficiently to allow the spring to slip on the inner sleeve 59 and rotate with the handle. The cam has a projecting lug 38' fixed thereto which projects behind the hooked end 62" of the spring, which the hooked end engages when the spring rotates counter clockwise, to cause the cam to rotate with the spring and handle and end sleeve counter clockwise with the handle, as long as pressure is applied to the handle for its rotation to keep the spring sufficiently expanded to allow the spring rotation.

The end sleeve 58 has a projecting lug 58', which engages the other end 59" of the spring 62. The other end of the end sleeve 58 has projecting lugs 58", which project into slots 64' of a ring 64, so that the ring 64 rotates with the handle 37 and the ring drives the end sleeve 54 so that the ring and end sleeve can rotate together. However, the ring fits freely over the inner sleeve 59 so that the ring can rotate independently of the inner sleeve. The ring, however, is fixed to the handle by an eyelet 63' fixed to the ring. A screw is threaded into the eyelet to hold the eyelet and ring to the handle, to cause the ring and end sleeve to rotate with the handle. The screw holds the ring to the handle in fixed detachable relation, so that the ring may be adjusted relative to adjust the end sleeve to an adjusted position.

Consequently, the rotation of the handle clockwise, rotates the ring 64, the ring 64 engages the end sleeve 58 causing the end sleeve to rotate, the end of end sleeve engages the end 59" of the spring causing the spring to expand from its fixed tight position about the inner sleeve 59 and free the spring from the inner sleeve to allow the spring, as well as the handle, ring and end sleeve to rotate clockwise. The rotation of the handle clockwise causes its outer sleeve edge portion 63" of the sleeve 63 to engage the projecting lug 38' of the cam 38 and rotate the cam clockwise when viewed from FIG. 7, and the rotation of the cam clockwise causes the frame 22 to be lowered relative to frame 23.

For angular rotational adjustment of the frame 22 in the plane of frame 22; a turnbuckle connection 65 is provided between frames 22 and 23 to provide the angular adjustment of frame 22 in its plane, relative to frame 23 and the main frame 21 about the bolt 57. Since both channels may pivot about the bolt, this enables frame 22 to pivot with the channels about the bolt relative to frame 23. While the one C shaped plate 36' is fixed to the frame 22; other C shaped plate 36" is pivotal mounted to frame 23 by bolt 57 so that the entire guideway, including both plates or channels 36' and 36" and frame 22, can pivot about the bolt 57 to frame 23.

The turnbuckle 65 is of a conventional construction having mounting rods 66 and 66' threaded into opposite ends of a sleeve 65'. The rods 66 and 66' are pivotally mounted to flanges 67 and 67'. Flange 67 is fixed to the C shaped channel 36' and is thereby fixed to frame 22. Flange 67' is fixed to the mounting plate 64, which plate in turn is fixed to frame 23, so that flange 67' is fixed to frame 23. Flange 67' being fixed to frame 23 will not pivot, while flange 67 being fixed to the channel 36' will pivot with the channels and frame 22 about bolt 57.

The rods 66 and 66' are threaded in opposite directions and the corresponding upper and lower portions of the turnbuckle sleeve are threaded in opposite directions. Consequently, rotating the sleeve 65' of the conventional turnbuckle in one direction will draw the rods 66 and 66' toward one another, thereby drawing or pivoting flange 67 toward flange 67' about the axis of bolt 57, thereby pivoting frame 22 relative to frame 23, about the axis of bolt 57.

The lower end of frame 22, being pivotally mounted to the main frame 21 through the link plates enables the frame 22 to pivot to a limited extent about the axis of bolt 57, thereby providing a limited angular adjustment of frame 22, relative to frame 23, about horizontal axis of bolt 57.

A plate 68 is fixed to frame 23 and has a arcuate slot 68'. A bolt 69 is fixed to channel 36' and extends through the arcuate slot and is fixed to the plate 61 so that the plate can pivot with the channel 36" by the bolt traveling in the slot to enable the plate 61 to provide a constant surface for the cam to engage to raise the frame 22 relative to frame 23 when the frame 22 is pivoted arcuately relative to frame 23 as the bolt can move to the limit of the arc slot, with the limit of the degree of the pivotal movement limited by the length of the arcuate slot, when frame 22 is pivoted about bolt 57 relative to frame 23 for the angular adjustment. A nut may be provided on the bolt to keep the plate close the channel 36" while allowing the channel to pivot relative to the plate 68.

Operation of the Apparatus 20 to Attach a Door is as Follows:

The door attaching device 20 will normally be wheeled or rolled to a door for attachment with the frames 22 and 23 pivoted rearward as shown in solid lines in FIGS. 1 and 2. When the device reaches the door the lever 25 will be pivoted approximately 180 degrees counterclockwise when viewed from FIGS. 1 and 2 to its position shown as phantom lines in FIG. 1 and solid lines in FIG. 2. This forward movement of the lever moves the frame 22 to approximately vertical and simultaneously pivots the plate 33 forward and downward flush with the ground to stabilize the device. A door for attachment will be placed on the lower ledge of frame 22 and rested against the frame 22 as shown and the arms will be extended outward to enable their hooked ends to encircle the door and thereafter released to allow their springs to retract the rods so their hooked ends will encircle the door in close proximity to hold the door on frame 22 securely and tightly.

Then the operator will pivot the lever 25 back clockwise to its storage position as shown in solid lines in FIG. 1. Whereupon, the operator will wheel the device, with the door thereon to the doorway where the operator wishes to attach the door. Once, the operator reaches the doorway with the device and door thereon, he will wheel the edge of the door for attachment to the doorway edge to which is to be attached, with the door extending perpendicular away from the doorway. He will move the lever 25 forward until the door is parallel to, and the door edge is sufficiently close or adjacent to the doorway edge to enable attachment of the door hinges to the door and doorway. Further, in order to provide sufficient space between the floor and the bottom edge of the door, before attachment, the operator will pivot the handle 38 counterclockwise viewed from FIG. 7 to elevate the door to a suitable height off the floor for its attachment to the doorway, by elevating the frame 22.

Also, since the floor may not be perfectly perpendicular to the doorway panel in the plane of the door and first frame, or in other words in a plane passing through the device perpendicular to its front to rear adjustment in a plane passing laterally from one side of the device to the other; the operator may turn the turnbuckle sleeve 65' in direction to change the angular lateral position of the frame 22 relative to frame 23, until the door on frame 22 aligns perpendicular to the laterally as well as front to rear. This should place the door in a position so that the hinges may be attached to the door to thereby attach the door to the doorway.

The door will normally be attached with the door extending approximately perpendicularly away from the plane of the doorway. This provides sufficient space between the door and doorway, when attached, so that the lateral engaging arms to be drawn outward sufficiently away from the door to detach the arms from the door, once the door has been attached; so that the device can then be backed away from the door. The angle of the forward ends of the arms facilitate their removal from the door after the door has been attached.

What is claimed is:

1. A door attaching apparatus comprising a mobile main frame adapted to be moved upon a surface, said mobile main frame having forward portions, a first upward extending frame having lower ledge means fixed thereto for supporting a generally upward elongated door having a bottom edge with said lower ledge means supporting door at its bottom edge thereon;

a second upward extending frame having a lower edge pivotally mounted to the main mobile frame behind the first frame to move forward and rear relative to the main mobile frame;

a upward and downward sliding guide way mechanism between said first and second frame, said guide way mechanism having two cooperating channels slidably connected together with one of said channels pivotally mounted to said first frame and the other channel attached to the second frame whereby the first frame may slide upward by its channel sliding upward in the second channel relative to the second frame and mobile main frame, with said mechanism providing a connection between said first and second frame whereby said first frame may move forward and rearward with said second frame relative to said main mobile frame;

a cam mounted on said first frame, a first handle operating said cam to engage said second frame to rotate said cam to cam said first frame upward and downward relative to the second frame and relative to the mobile frame;

a lever rod means connecting said second frame to said mobile main frame, said lever rod means having a second handle to rotate to operate said lever rod means to lever said second frame forward and rearward and through said sliding guide way connection to said first frame simultaneously lever said first frame forward and rearward;

a ground engaging plate movably mounted to said mobile main frame and movable in response to said second handle to move downward to engage the surface beneath the mobile main frame when said second handle levers said first and second frames forward to provide ground stabilization for said apparatus;

generally horizontal extending telescoping arms for engaging the door on it opposing sides while said door rests with its bottom edge upon the lower ledge means of the first frame.

2. A door attaching apparatus for attaching a door having a lower edge and opposed sides comprising a mobile frame having a first upward and second upward positioned frames each movably mounted on said mobile frame with said first frame forward of said second frame;

sliding guide way means slidably connecting said first and second frame in upward and downward relation, raising and lowering means to raise and lower said first frame; relative to said second frame in said sliding guide way means and relative to said mobile frame;

said first frame having lower ledge means to support a door thereon on its lower edge and lateral telescoping means to laterally grasp the door along its opposed sides;

forward and rearward moving means on said mobile frame to move said first and second frames forward to place said first frame with the door thereon in an upright position; whereby the door may be placed in a supporting position on said first frame and grasped by said first frame, and rolled on the mobile frame to an upright doorway, and the door may be moved forward in the doorway on the mobile frame into upright position relative to the doorway, and the raising and lowering means may be operated to raise the door to a proper height in the doorway for attachment of the door in the doorway while in said upright position in the doorway.

3. A door attaching apparatus for a door having a bottom edge and lateral sides comprising a mobile frame, first upward and second upward frames/positioned on said mobile frame, said first frame being movably mounted relative to said mobile frame upward and downward and forward and rearward, said second frame being movably mounted to said mobile frame to move forward and rearward;

guide way means connecting said first and second frames in upward and downward sliding relation with means to raise and lower said first frame to said second frame and mobile frame on said guide way means, said first frame having means along its bottom to support the door along its bottom edge and means to grasp a door along its lateral opposed sides;

means to move said fist frame upward and downward relative to said second frame and mobile frame, lever rod means to lever said second frame forward and rearward, whereby a door may be placed and grasped on said first frame and moved on the mobile frame to a doorway and said second frame upon being levered forward to lever said first frame forward to place the door a proper upright position in the doorway and means to raise the first frame may be operated to raise the first frame and door thereon to a proper height in the doorway for attachment of the door to the doorway while in said upright position in the doorway.

4. A door attaching apparatus according to claim 1, wherein said cam means includes locking means for said cam in selected adjusted position, alter said cam has been adjusted by said first handle to the selected adjusted position.

5. A door attaching apparatus for supporting a door having a bottom edge and lateral opposing sides comprising a mobile frame adapted to be rolled along a surface, a upward extending first frame having lateral sides and a bottom and a top, a flange along the bottom to receive a door along its bottom edge, lateral telescoping rods intermediate the height of the first frame and spring urged to telescope laterally toward one another to grasp the lateral opposing sides of the door, said rod having hooked outer ends to grasp the door along its lateral edges when the door bottom edge rest upon the bottom flange of the first frame, elevating mechanism on the mobile frame to elevate the first frame relative to the mobile frame to raise and lower the first frame relative to the surface to place the door at a proper height for installation of the door in a doorway;

adjustment means connecting the first frame to the mobile frame to rotate the first frame in the plane of the first frame and door thereon relative to the mobile frame to adjust the angular relation of the door to the doorway, forward and rearward adjustment means on the mobile frame to adjust the first frame and door thereon in a plane perpendicular to the plane of the first frame.

6. A door attaching apparatus according to claim 5 wherein surface supporting means are on the mobile frame along forward portions of the mobile frame to engage the surface upon actuation of the forward and rearward adjustment means.

\* \* \* \* \*